UNITED STATES PATENT OFFICE.

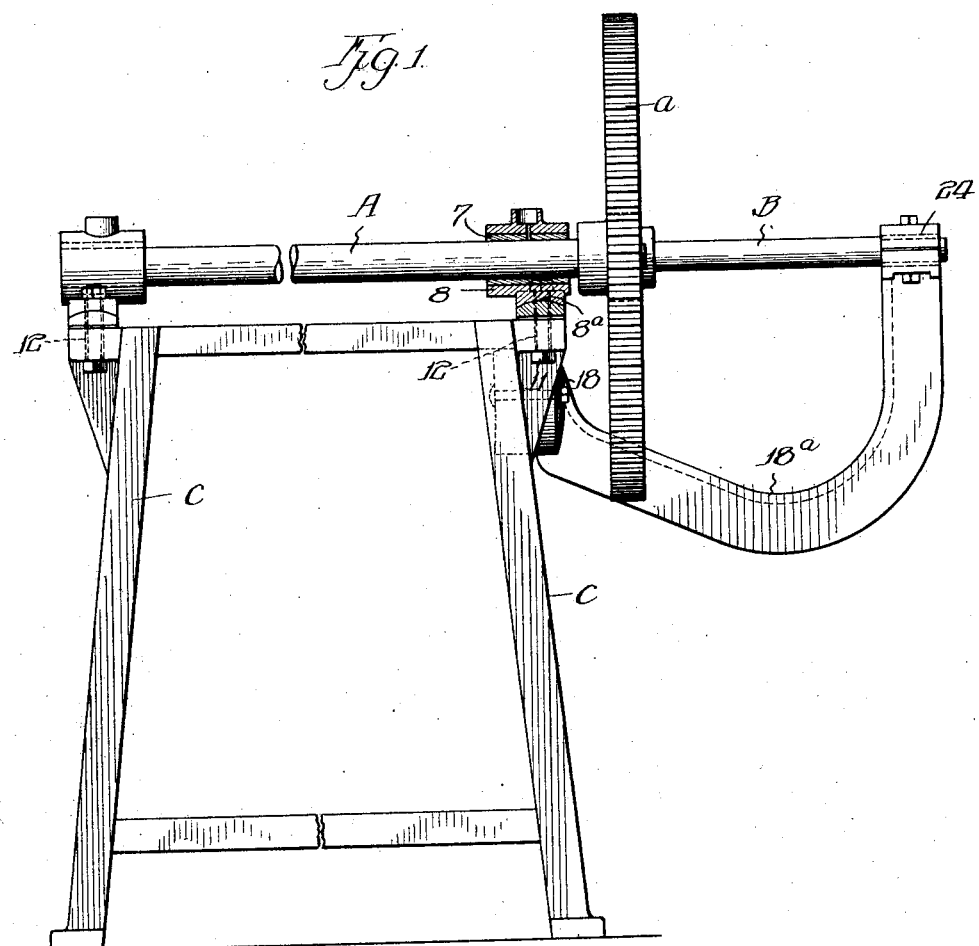
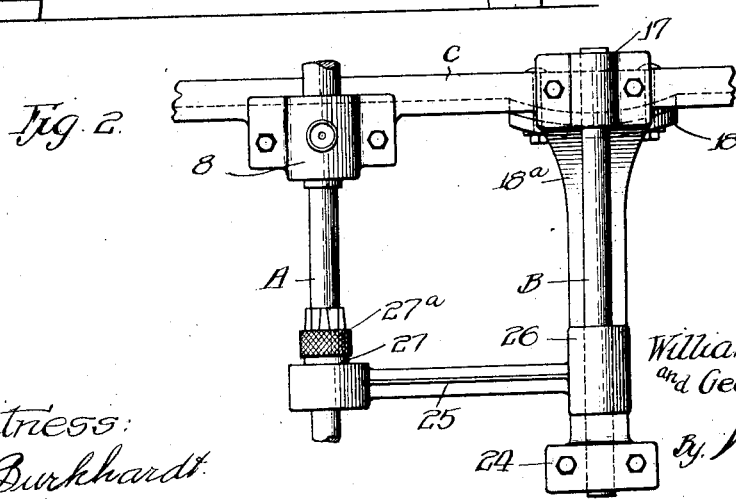

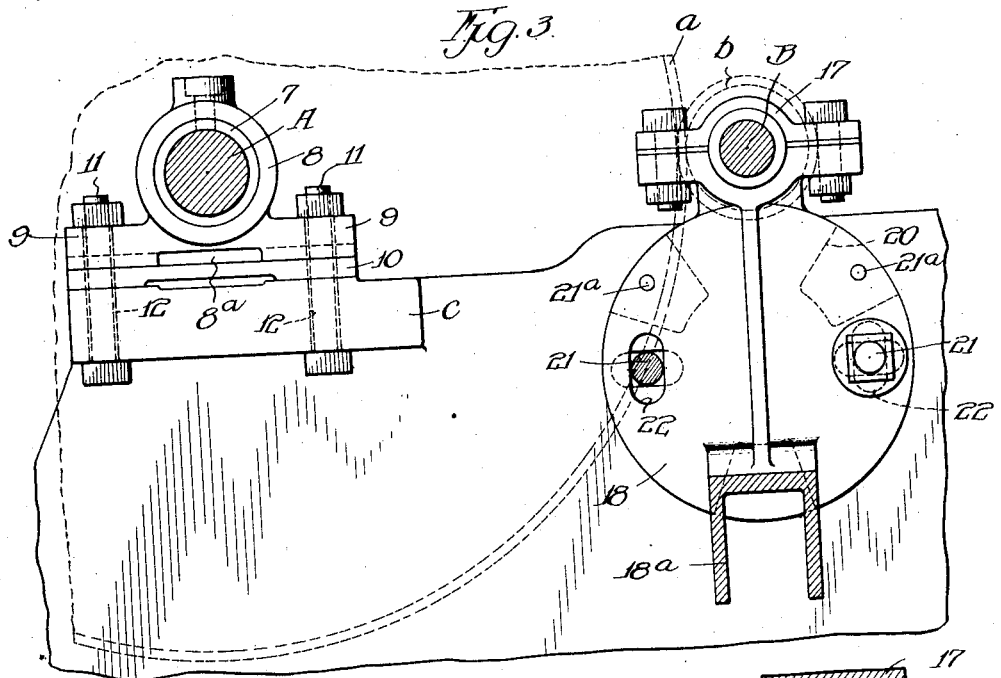

WILLIAM BARTHOLOMEW AND GEORGE SIMON, OF CHICAGO, ILLINOIS, ASSIGNORS TO TROY LAUNDRY MACHINERY CO., LTD., OF CHICAGO, ILLINOIS, A CORPORATION OF NEW YORK.

SELF-ALINING SHAFT-BEARING.

1,388,321.

Specification of Letters Patent. Patented Aug. 23, 1921.

Application filed September 12, 1919. Serial No. 323,246.

*To all whom it may concern:*

Be it known that we, WILLIAM BARTHOLOMEW and GEORGE SIMON, citizens of the United States, residing at Chicago, in the county of Cook and State of Illinois, have invented certain new and useful Improvements in Self-Alining Shaft-Bearings, of which the following is a specification.

This invention relates to power transmission through means of a pair of parallel shafts carrying intermeshing gear-wheels, and has for its primary object to so mount the bearings for such a pair of shafts as to permit the shafts to assume parallelism and their intermeshing gear wheels to lie in the same plane, notwithstanding derangement of or inaccuracy in the machine frame or other structure with which the shafts are associated; a subordinate object of the invention being to provide a yoke or assembling jig through which the shafts may be held in their proper geometric relation, so that through means of the shafts the bearings may be accurately mounted.

One feature of the invention consists in providing supports through which to mount the two spaced bearings of the first shaft upon a machine frame, which supports are adjustable upon the frame both angularly and bodily in a plane parallel to the axis of the shaft, thereby permitting alinement of the two bearings in one plane; and each of which supports receives its bearing through the medium of a cylindrical saddle having its axis of generation transverse to the axis of the shaft, and thereby adapted to determine the plane of the shaft which is perpendicular to the plane first named.

Another feature of the invention consists in mounting the bearings for the second shaft upon the frame through means of a support having a spherical seat upon the frame, which affords the support, and therefore the second shaft bearings and the shaft carried thereby, universal adjustment upon the frame to an extent which will permit the second shaft to assume parallelism with the first shaft by angular adjustment in two perpendicular planes; a subordinate feature incident to this portion of the invention consisting in so offsetting the alined axes of the second shaft-bearings with relation to the spherical seat that the second shaft can be adjusted to and from the first shaft while maintaining parallelism of said shafts, and so insure proper intermeshing of the transmission gears.

The invention will be fully understood upon reference to the accompanying drawings, in which—

Figure 1 is an end elevation of a machine frame having applied thereto the several features of the present invention, excepting the alining jig.

Fig. 2 is a plan view of the same showing the application of the alining jig.

Fig. 3 is a side elevation of parts shown in Fig. 1, with the second shaft support in vertical section.

Figs. 4 and 5 are detail views, respectively, of the base of the second shaft support and the spherical seat therefor; and Fig. 6 is a sectional view of the inner end of the second shaft support, and showing in assembly the parts illustrated in Figs. 4 and 5.

A and B represent two shafts to be mounted in relation to have power transmission between them, as for instance, through the reducing gear wheels $a$ and $b$ mounted thereon, and C represents any machine frame or other structure upon which said shafts are to be mounted.

Referring more particularly to Figs. 1 and 3, 7 represents babbitts or bushings that receive the shaft A, and which are carried by boxes or bearings 8 having laterally extending lugs 9 through which they are anchored upon supports 10 through the medium of bolts 11.

In order that bearings 8 may have their axes alined in the vertical plane of the shaft A and avoid binding upon said shaft in that direction, as well as establish the horizontal plane of the shaft, bearings 8 seat upon the supports 10 through the medium of cylindrical saddles 8ª, the axes of generation of which, in the organization shown, are transverse to the axis of shaft A and in a horizontal plane.

In order that the bearings 8 may have their axes alined in a horizontal plane, the clamping bolts 11 fit loosely in bearings 8 and supoprts 9, and also in slots 12 of the frame so that the supports 10 may shift upon frame C angularly in the horizontal plane as well as bodily therein from side to side.

With the above-described method of supporting two spaced bearings for a shaft, the coaxial relation of the two bearings may be accurately established either in original assembly of the machine or at any time when it may be desirable to compensate for deterioration of parts of the structure upon which the bearings and shaft are mounted, as it is obviously simply a matter of loosening the clamping bolts 11, revolving the shaft until the bearings accurately aline themselves with the axis of the shaft and the shaft turns freely without binding in its bearings, and then retightening the clamping bolts to secure the parts in the position which they have assumed.

In order to properly relate to a shaft, such as the shaft A carrying gear-wheel $a$, another shaft laterally offset therefrom, such, for instance, as the shaft B, and carrying a gear wheel $b$ that must intermesh with and transmit power to or from the gear-wheel on the first-mentioned shaft, the present invention supports the bearing 17 of the second shaft through a mounting which comprises an attaching base 18 carrying the bearing and a seat 19 carried by the frame of the machine; the attaching base 18 and the seat 19 being made to meet in the surface of a sphere. In order to insure accurate seating of one part upon the other without the expensive process of grinding or machining the relatively large spherical surfaces 18 and 19, said surfaces are arranged to contact through three relatively small sub-divisions of contacting area, as, for instance, by forming three bosses 20 on one of the members. In this way a firm seating may be obtained through the medium of surfaces produced by the process of casting without the expense of finishing. By this arrangement it is obviously easy to establish parallelism between the shafts A and B by sliding the member 18 upon the member 19 in the vertical or horizontal direction, or in any direction intermediate thereto, and by rotating the member 18 upon the member 19, and about a radius of the sphere of which the contacting surfaces form a part, the spacing of the shafts may be determined at will. Thus, the mounting for the bearing 17, which carries the shaft B, has substantially universal adjustment. In order to hold the members 18 and 19 together, bolts 21 are employed which pass through said members, as shown in Fig. 3; said members 18 and 19 being provided with slots 22 and 23 which receive said bolts, and the elongation of said slots being in directions at right angles to each other in order that the parts may move relatively when the bolts are loosened and adjustment is required. Dowel holes 21ª are preferably also provided in the members 18 and 19 for initially positioning them.

In order to properly support and aline the second shaft when it does not extend across the machine, the base 18 is provided with an arm 18ª extending outwardly and upwardly to receive the outer bearing 24 for shaft B. This also assists in properly positioning the supports.

For accurately alining the shafts, a jig or yoke 25 is provided having sleeves 26, 27 to receive shafts A, B, or counterparts thereof, and constructed as an instrument of precision so that whenever the shafts are held in its sleeves they will be accurately spaced and alined; and if at the same time the shafts are freely movable in their permanent bearings upon the machine, the latter are properly alined and the bolts 11 and 21 may be tightened up to fix the bearings at the adjustment thus established. Sleeve 26 is adapted to slide upon shaft B, but sleeve 27 is split and provided with a gripping ring 27ª so that it can be made to hold the shaft A rigidly, and by sliding the yoke on shaft B and sliding shaft A through the front bearing 8 until it meets the rear bearing 8, then threading shaft A through the latter, the bearings may be assumed to be all in proper relation when the jig moves freely, and the bolts that secure the first shaft bearings and the second shaft support may then be tightened up. To remove the jig, the cap plates of the bearings 17 and 24 may be removed to release the shaft B and permit the jig to be slid off the shaft A, or to draw shaft A out of its bearings, after which the shafts may have their gear-wheels applied, or may be substituted by identical shafts carrying the gear-wheels.

We claim:

1. In a shaft mounting, a shaft, bearings in which said shaft is rotatably mounted, bearing supports, and frames carrying said bearing supports with freedom of adjustment bodily and angularly in a plane parallel to the axis of the shaft; said bearings resting upon the supports through concave cylindrical surfaces whose axes of generation are remote from the shaft and in planes transverse to its axis.

2. In a shaft mounting, a bearing adapted to rotatably support a shaft and constructed with a concave cylindrical saddle whose axis of generation is remote from the axis of the bearing, and extends transversely to the axis of the bearing, a convex bearing support conforming to said cylindrical concave saddle, and a mounting for said bearing support universally adjustable in a plane parallel with the axis of the bearing.

3. In a shaft mounting, a shaft, bearings rotatably supporting said shaft constructed with concave cylindrical saddles the axis of generation of which extends perpendicularly to the axis of the shaft and are remote therefrom, bearing supports having conforming surfaces through which they receive the saddles of the bearings, and upon which said bearings are bodily and angularly adjustable in a plane including the axis of the shaft, and means upon which said bearing supports are mounted with angular adjustment in a plane parallel to the axis of the shaft but perpendicular to that of the bearing adjustment.

4. In a mounting for shafts, the combination of a first shaft rotatably supported and having a gear-wheel through which it is driven, a second shaft having a gear-wheel through which it transmits power to the first shaft gear-wheel, a bearing for the second shaft, and a mounting for said bearing comprising an attaching base carrying said bearing, and a seat for said attaching base; said attaching base and seat meeting through spherical surfaces and having means for adjustably holding them together.

5. In a mounting for shafts, the combination of a first shaft rotatably supported and having a gear-wheel through which it is driven, a second shaft having a gear-wheel through which it transmits power to the first shaft gear-wheel, two spaced bearings for the second shaft, and a mounting-arm carrying both said bearings and comprising an attaching base and a seat for said attaching base; said attaching base and seat meeting through spherical surfaces and having means for adjustably holding them together.

6. In a mounting for shafts, the combination of a first shaft, bearings in which said first shaft is rotatably mounted and which are supported with angular adjustment in two perpendicular planes, a second shaft in power-transmitting connection with said first shaft, a bearing for said second shaft, and a mounting for said bearing adjustable to position the second shaft in parallelism with the axis of the first shaft and comprising an attaching base and a seat therefor; said attaching base and seat meeting through spherical surfaces and having means for adjustably holding them together.

7. In a mounting for shafts, the combination of a first shaft rotatably supported and having a gear-wheel through which it is driven, a second shaft having a gear-wheel through which it transmits power to the first shaft gear-wheel, a bearing for the second shaft, and a mounting for said bearing comprising an attaching base carrying said bearing and a seat for said attaching base; said attaching base and seat meeting through spherical surfaces and having means for adjustably holding them together; the spherical bearing surface on one of the last-named parts being subdivided into a plurality of symmetrically distributed faces.

8. In a mounting for shafts, the combination of a first shaft rotatably supported and having a gear-wheel through which it is driven, a second shaft having a gear-wheel through which it transmits power to the first shaft gear-wheel, a bearing for the second shaft, and a mounting for said bearing comprising an attaching base carrying said bearing and a seat for said attaching base; said attaching base and seat meeting through spherical surfaces and having means for adjustably holding them together; the bearing surface of one of the last-named parts being distributed over three symmetrically disposed lugs.

9. In a mounting for shafts, the combination of a first shaft rotatably supported and having a gear-wheel through which it is driven, a second shaft having a gear-wheel through which it transmits power to the first shaft gear-wheel, a bearing for the second shaft, and a mounting for said bearing comprising an attaching base carrying said bearing and a seat for said attaching base; said attaching base and seat meeting through spherical surfaces and having means for adjustably holding them together; said attaching base and seat being offset from the axis of said second shaft bearing so that the space between the first and second shafts may be changed by shifting said mounting.

10. In a mounting for shafts, the combination of a first shaft rotatably supported and having a gear-wheel through which it is driven, a second shaft having a gear-wheel through which it transmits power to the first shaft gear-wheel, two spaced bearings for the second shaft, and a mounting-arm carrying both said bearings and comprising an attaching base and a seat for said attaching base; said attaching base and seat meeting through spherical surfaces and having means for adjustably holding them together; and said attaching base and seat being offset from the axis of said second shaft bearing so that the space between the first and second shafts may be changed by shifting said mounting.

11. In combination with a machine frame, a pair of alined first shaft bearings mounted thereon with freedom of adjustment in planes axial to them, a mounting arm having a universal adjustment on said frame and carrying a pair of alined shaft bearings axially parallel with the first shaft bearings, and means for justifying all of said bearings, comprising a yoke, a shaft carried by said yoke in position to move axially in the first shaft bearings, a sleeve axially parallel with said carried shaft, and a shaft on which said sleeve is adapted to slide and which is supported in said second shaft bearings on opposite sides of said sleeve.

Signed at Chicago, Illinois, this 2d day of September, 1919.

WILLIAM BARTHOLOMEW.
GEORGE SIMON.